United States Patent
Choi et al.

(10) Patent No.: US 9,117,122 B2
(45) Date of Patent: Aug. 25, 2015

(54) APPARATUS AND METHOD FOR MATCHING PARKING-LOT OUTLINE

(71) Applicants: Hyundai Motor Company, Seoul (KR); Kia Motors Corporation, Seoul (KR); Industry-University Cooperation Foundation Hanyang University, Seoul (KR)

(72) Inventors: Jae Seob Choi, Gyeonggi-do (KR); Seong Sook Ryu, Seoul (KR); Dae Joong Yoon, Gyeonggi-do (KR); Eu Gene Chang, Gyeonggi-do (KR); Ho Gi Jung, Seoul (KR); Jae Kyu Suhr, Incheon (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 189 days.

(21) Appl. No.: 14/043,016

(22) Filed: Oct. 1, 2013

(65) Prior Publication Data
US 2014/0355822 A1    Dec. 4, 2014

(30) Foreign Application Priority Data
Jun. 4, 2013  (KR) .................. 10-2013-0064181

(51) Int. Cl.
*G06K 9/00* (2006.01)
*B60Q 1/48* (2006.01)

(52) U.S. Cl.
CPC .................. *G06K 9/00812* (2013.01)

(58) Field of Classification Search
USPC ......... 382/100, 103–107, 155, 162, 168, 173, 382/181, 193, 199, 209, 219, 232, 254, 274, 382/276, 286–291, 305, 312; 340/932.2; 348/148
See application file for complete search history.

(56) References Cited

U.S. PATENT DOCUMENTS

| | | | |
|---|---|---|---|
| 2007/0146165 A1* | 6/2007 | Tanaka | 340/932.2 |
| 2008/0136673 A1* | 6/2008 | Jung | 340/932.2 |
| 2009/0207045 A1* | 8/2009 | Jung | 340/932.2 |
| 2010/0079307 A1 | 4/2010 | Tanaka et al. | |
| 2013/0113936 A1* | 5/2013 | Cohen et al. | 348/148 |
| 2014/0112542 A1* | 4/2014 | Choi et al. | 382/104 |

FOREIGN PATENT DOCUMENTS

| | | |
|---|---|---|
| JP | 2006175918 A | 7/2006 |
| JP | 2006311299 A | 11/2006 |
| JP | 2011006005 A | 1/2011 |
| KR | 10-2008-0024776 | 3/2008 |
| KR | 10-2009-0088210 A | 8/2009 |
| KR | 10-2012-0086576 A | 8/2012 |

* cited by examiner

*Primary Examiner* — Seyed Azarian
(74) *Attorney, Agent, or Firm* — Mintz Levin Cohn Ferris Glovsky and Popeo, P.C.; Peter F. Corless

(57) ABSTRACT

An apparatus and a method for tracing a parking-lot is provided that includes a controller configured to recognize at least one parking-lot from a previous image frame which photographed a surrounding of a vehicle and extract a template according to a type of a parking-lot line of the recognized parking-lot. In addition, the controller is configured to generate a template transformed based on a position information of the parking-lot and calculate similarity by comparing a template generated from a previous image frame with a parking-lot line recognized from a current image frame. A position of a parking-lot is determined according to the calculated similarity and the controller is configured to correct the template based on an information of a parking-lot line extracted from the determined position.

15 Claims, 12 Drawing Sheets

T-junction

L-junction

Y-junction

I-junction

T-junction

L-junction

Y-junction

I-junction

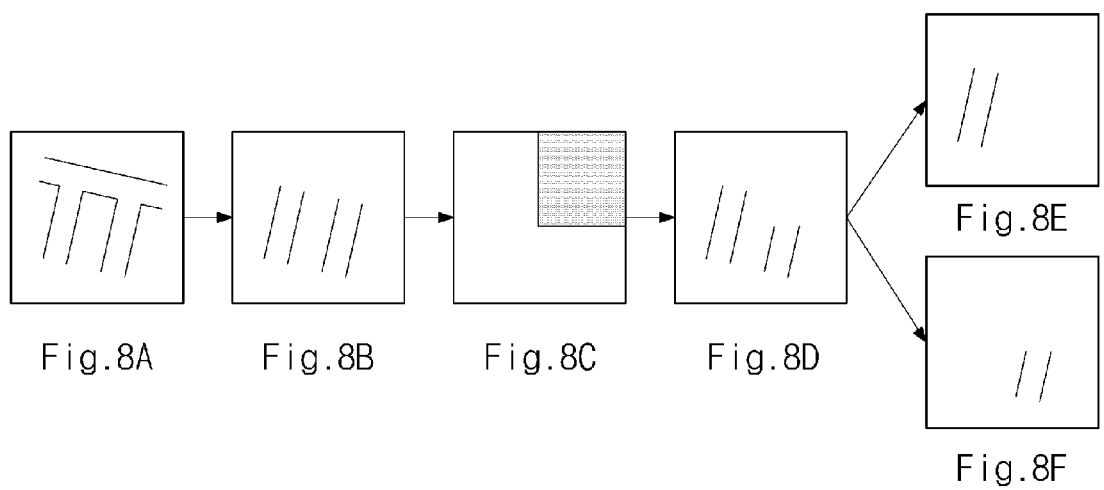

APPARATUS AND METHOD FOR MATCHING PARKING-LOT OUTLINE

CROSS-REFERENCE TO RELATED APPLICATION

This application is based on and claims priority from Korean Patent Application No. 10-2013-0064181, filed on Jun. 4, 2013 in the Korean Intellectual Property Office, the disclosure of which is incorporated herein in its entirety by reference.

BACKGROUND

1. Field of the Invention

The present invention relates to an apparatus and a method for tracing a parking-lot, and more particularly, to a technology that may be applied to trace a parking-lot while providing a parking assistance by generating a template that corresponds to a parking-lot line from an image obtained from a parking area.

2. Description of the Related Art

A parking supporting system traces a parking-lot while operating the parking supporting system (e.g., parking assistance), and provides parking assistance that corresponds to a selected target parking-lot. Such parking supporting systems require the information regarding the parking-lot to be continuously updated while providing parking assistance since it recognizes the parking-lot based on an Automatic Vehicle Monitoring (AVM) image.

However, due to an image distortion caused by the characteristic of the Automatic Vehicle Monitoring (AVM) image, a recognition of the parking-lot may not be accurate, and the system may have difficulty in tracing the parking-lot as the parking-lot may be misrecognized when the parking-lot line is hidden by the vehicle or an obstacle, or accuracy of the recognized parking-lot is decreased.

SUMMARY

The present invention provides an apparatus and a method that traces a parking-lot which enables generation of a template that corresponds to a parking-lot line from an image obtained from a parking area, and generation of a substantially accurate template that corresponds to the parking-lot line by comparing a current image and a previous image.

The present invention further provides an apparatus and a method for tracing a parking-lot which simplifies the tracing of the parking-lot by using a template generated based on the parking-lot line in tracing the parking-lot.

In accordance with an aspect of the present invention, an apparatus for tracing a parking-lot may include a plurality of units executed by a controller. The plurality of units may include a parking-lot recognition unit that recognizes at least one of a parking-lot from a previous image frame which photographed a parking area; a template generation unit that generates a template that corresponds to a parking-lot line of the recognized parking-lot; a similarity calculation unit that calculates a similarity by comparing the parking-lot line recognized between a template generated from a previous image frame and the parking-lot line recognized from a current image frame.

The template generation unit changes a thickness of the parking-lot line and a width of the parking-lot of the template within a certain range and generates a plurality of templates. The template generation unit generates a template by each type of the parking-lot when a parking-lot of a different type is recognized. The similarity calculation unit calculates a similarity between a parking-lot line recognized within a region of interest and the template, when the region of interest based on a movement of the vehicle is set on the current image frame. The similarity calculation unit corrects the calculated similarity when a parking-lot recognized on the current image frame is hidden by the vehicle or an obstacle. The template correction unit determines a position and an orientation where a similarity with the template corresponding to the parking-lot line recognized on the current image frame is the highest based on the calculated similarity. The template correction unit corrects the template by determining a thickness of a parking-lot line and a width of a parking-lot extracted from the determined position as a parameter of final template.

In accordance with another aspect of the present invention, a method for tracing a parking-lot may include: recognizing, by a controller, at least one parking-lot from an image frame photographed around a vehicle; generating, by the controller, a template that corresponds to a parking-lot line of the recognized parking-lot; calculating, by the controller, a similarity by comparing a parking-lot line recognized from a current image frame with a template generated from a previous image frame; and determining, by the controller, a position of the parking-lot according to the calculated similarity, and correcting the template based on information of a parking-lot line extracted from the determined position.

The generating a template may include adjusting a parking-lot line thickness and a parking-lot width of the template within a certain range and generating a plurality of templates. The generating a template may include generating a template by each type of the parking-lot, when a parking-lot of a different type is recognized. The calculating the similarity may include calculating a similarity between a parking-lot recognized within a region of interest and the template when a movement-based region of interest of the vehicle is set on the current image frame.

In accordance with another aspect of the present invention, after calculating the similarity, a method for tracing a parking-lot may further include: correcting, by the controller, the calculated similarity when the parking-lot line recognized on the current image frame is hidden. The correcting the template may include determining a thickness of the parking-lot line and a width of the parking-lot extracted from the determined position as a parameter of final template.

BRIEF DESCRIPTION OF THE DRAWINGS

The objects, features and advantages of the present invention will be more apparent from the following detailed description in conjunction with the accompanying drawings, in which:

FIGS. 6A-6D, 7, 8A-8F, and 9A-9B are exemplary diagrams illustrating a template correction operation of a parking-lot tracing apparatus according to an exemplary embodiment of the present invention;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
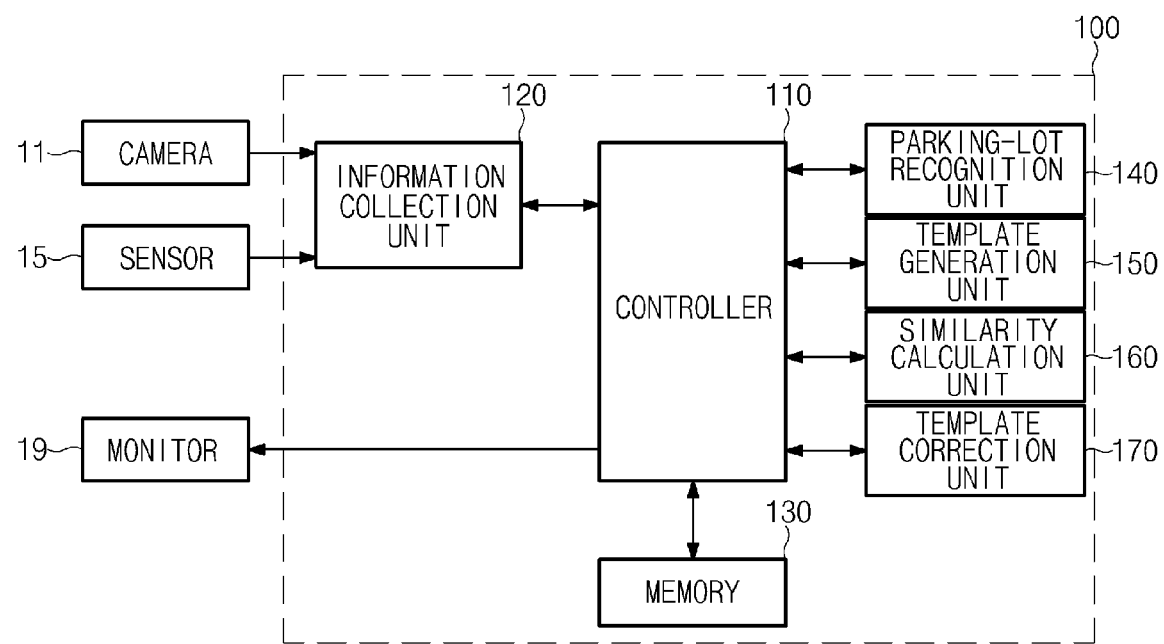
FIG. 1 is an exemplary block diagram illustrating a configuration of a parking-lot tracing apparatus according to an exemplary embodiment of the present invention.

FIG. 1 is an exemplary block diagram illustrating a configuration of a parking-lot tracing apparatus according to an exemplary embodiment of the present invention. Referring to FIG. 1, a parking-lot tracing apparatus 100 may include a controller 110, an information collection unit 120, a storing unit 130, a parking-lot recognition unit 140, a template generation unit 150, a similarity calculation unit 160, and a template correction unit 170. Here, the controller 110 controls an operation of each unit in the parking-lot tracing apparatus 100.

The information collection unit 120 may be configured to collect the information regarding a vehicle and a surrounding of a vehicle from an imaging device 11 (e.g., a camera, video camera, or the like) and a sensor 15 equipped on the vehicle. As an example, the information collection unit may be configured to collect an image photographed around the vehicle from the camera 11, or collect obstacle information around the vehicle using an ultrasonic sensor. In addition, the information collection unit 120 may be configured to collect a state information of the vehicle from a sensor equipped within the vehicle. Further, the collected information may be stored in the storing unit 130.

The parking-lot recognition unit 140 may be configured to recognize the parking-lot from an image frame of an image which has photographed a surrounding of a vehicle. In particular, the parking-lot recognition unit 140 may be configured to recognize the parking-lot by recognizing the parking-lot line. For example, the parking-lot recognition unit 140 may be configured to recognize the parking-lot by recognizing a white line in the form of the parking-lot. Of course, as long as it is a method for recognizing the parking-lot line, any operation of recognizing the parking-lot may be generally applicable, and it is not limited thereto.

The template generation unit 150 may be configured to extract the parking-lot line of the parking-lot recognized by the parking-lot recognition unit 140, and generate a template that corresponds to the extracted parking-lot line. The generated template may be stored in the storing unit 130.

Figure 2A:
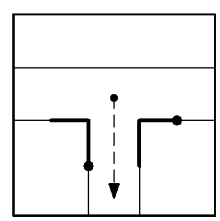
FIGS. 2A-2D and 3A-3D are exemplary diagrams illustrating an operation recognizing a parking-lot line of a parking-lot tracing apparatus according to an exemplary embodiment of the present invention.
Figure 2B:
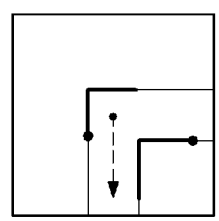
Figure 2C:
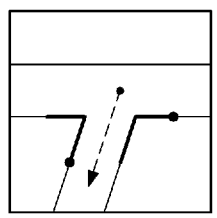
Figure 2D:
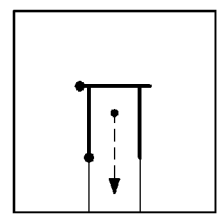

In particular, the template generation unit 150 may be configured to calculate a thickness of a parking line based on a distance between lines which face each other in each corner of the parking-lot line. The operation of calculating the thickness of the parking-lot line will be illustrated with reference to FIGS. 2A-2D. As illustrated in FIG. 2A, for a T-junction, the thickness of the parking-lot line may be calculated using an interval between each corner of a T-shape parking-lot line. In addition, in FIG. 2B for an L-junction, the thickness of the parking-lot line may be calculated using a distance between an inside line and an outside line of a corner. In FIG. 2C, for a Y-junction, the thickness of the parking-lot line may be calculated using an interval of each corner of a Y-shape parking-lot line as the T-junction. In FIG. 2D, for an I-junction, the thickness of the parking-lot line may be calculated using an interval between a right side and a left side line.

Figure 3A:
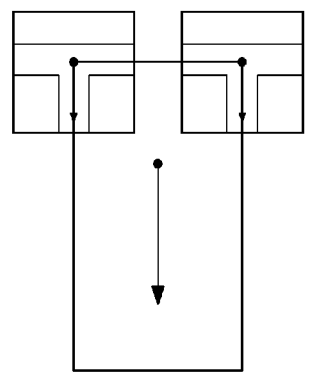
Figure 3B:
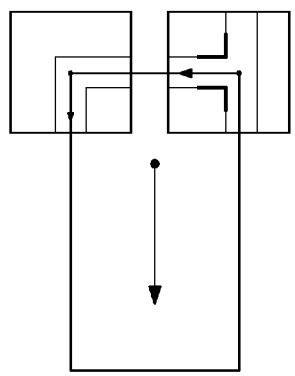
Figure 3C:
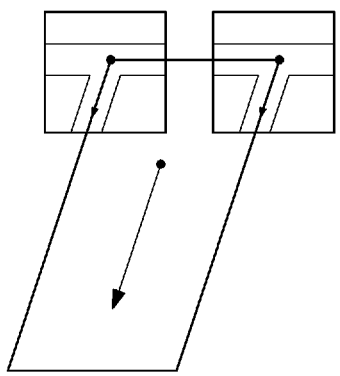
Figure 3D:
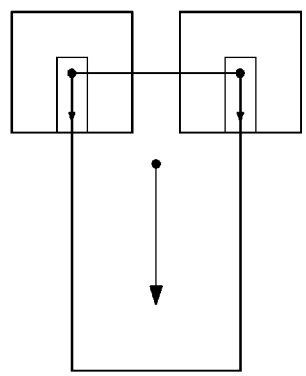

In addition, the template generation unit 150 may be configured to measure a width of the parking-lot based on a distance between each junction of the recognized parking-lot line. The operation calculating the width of the parking-lot will be illustrated with reference to FIGS. 3A-3D. Specifically, FIG. 3A illustrates a T-junction, FIG. 3B illustrates an L-junction, FIG. 3C illustrates a Y-junction, and FIG. 3D illustrates an I-junction. The width of the parking-lot may be calculated respectively through a distance between each junction which locates on both sides as illustrated in FIGS. 3A-3D.

Figures 4A, 4B, 4C, 4D:
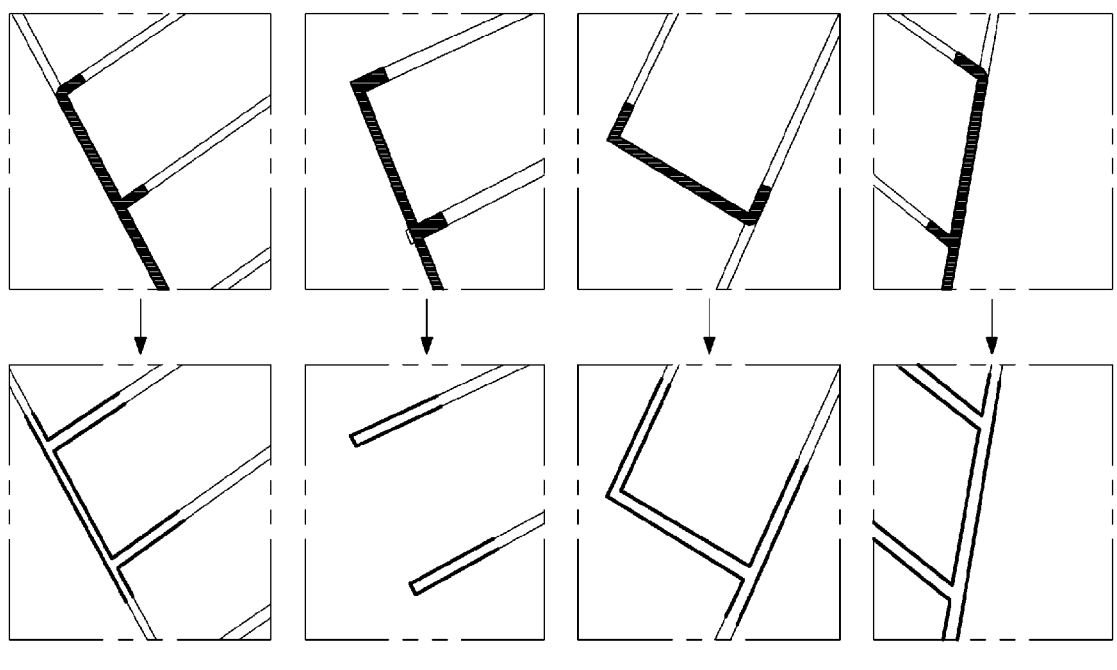
FIGS. 4A-4D are exemplary diagrams illustrating a template generation operation of a parking-lot tracing apparatus according to an exemplary embodiment of the present invention.

Moreover, the template generation unit 150 may be configured to generate a plurality of templates by changing the thickness of the parking-lot line and the width of the parking-lot within a certain range. In addition, when the parking-lot of different type is recognized, the template generation unit 150 may be configured to generate the template by each type of the recognized parking-lot. For example, the template generated by each type of the parking-lot may be indicated as shown in FIGS. 4A-4D. Referring to FIG. 4A, the template generation unit 150 may be configured to generate the template of a T-shape parking-lot. In addition, as shown in FIG. 4B, the template generation unit 150 may be configured to generate an I-shape template, and as shown in FIG. 4C, may be configured to generate an L-shape template. Furthermore, as shown in FIG. 4D, the template generation unit may be configured to generate Y-shape template.

Figure 5A:
FIGS. 5A-5C are exemplary diagrams illustrating an exemplary embodiment corresponding to a template generated in FIG. 4 according to an exemplary embodiment of the present invention.
Figure 5B:
Figure 5C:
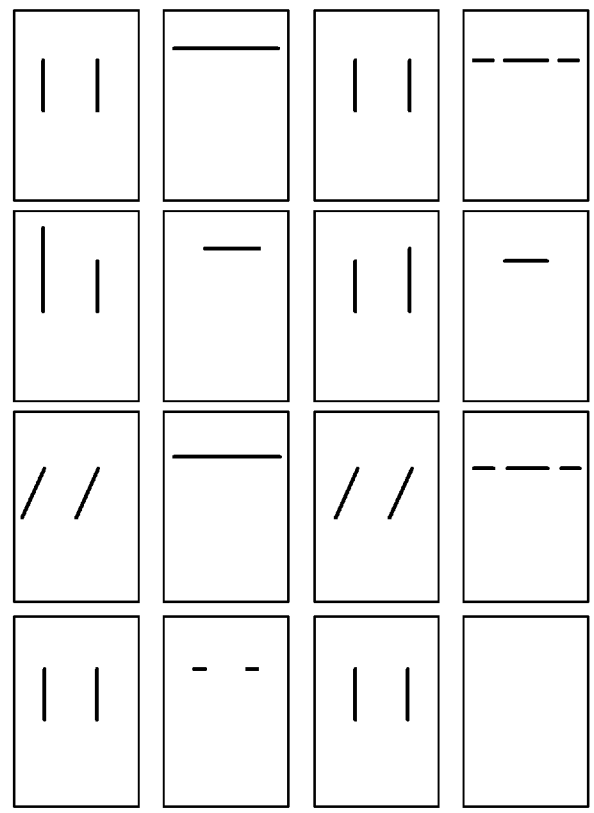

Furthermore, the template generated by each type of the parking-lot may refer to an exemplary embodiment illustrated in FIGS. 5A-5C. FIG. 5A shows a type of parking-lot, FIG. 5B shows a template of each parking-lot, and FIG. 5C indicates a template of each parking-lot which is classified by each parking-lot based on orientation. In particular, when classifying the template by orientation as shown in FIG. 5C, the orientation of edge point and the orientation of a brightness change may be considered together.

Figure 6A:
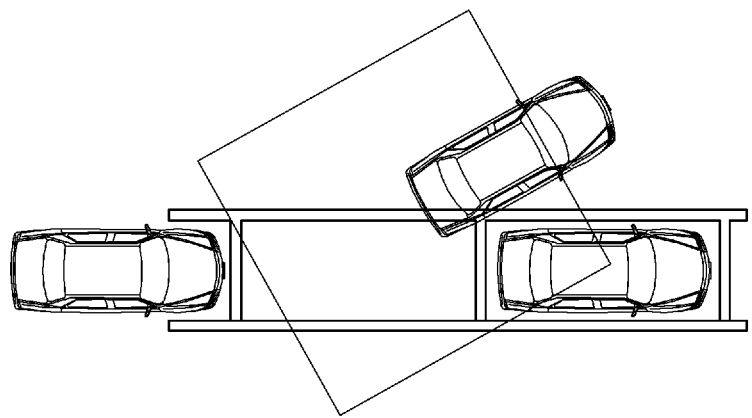
Figure 6B:
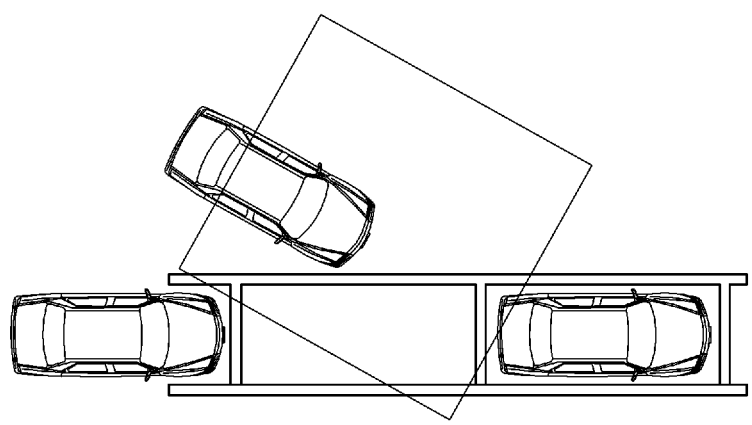
Figure 6C:
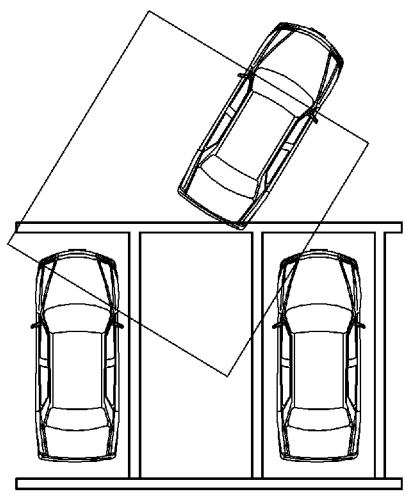
Figure 6D:
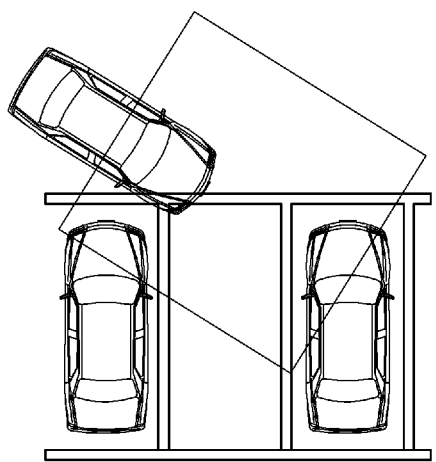

The similarity calculation unit 160 may be configured to calculate a similarity between the recognized parking-lot line and the template based on a region of interest which has been selected based on a movement of a vehicle from the current image frame. In particular, the region of interest may be selected by a user, or may be selected automatically according to the movement of the vehicle. The region of interest may be selected based on the parking-lot, and an exemplary embodiment of thereof will be illustrated with reference to FIGS. 6A-6D. FIG. 6A illustrates a parallel reverse parking, and in this embodiment, the controller, may be configured to select a vehicle rear area as the region of interest based on a vehicle position. FIG. 6B illustrates a parallel forward parking, and in this embodiment, the controller may be configured to select a vehicle front area as the region of interest based on a vehicle position. FIG. 6C illustrates a right angle reverse parking, and in this embodiment, the controller may be configured to select a vehicle rear area as the region of interest based on a vehicle position. In addition, FIG. 6D illustrates a right angle forward parking, and in this embodiment, the controller may be configured to select a vehicle front area as the region of interest based on a vehicle position.

Moreover, the similarity calculation unit 160 may be configured to calculate a similarity between the parking-lot line recognized from the current image frame and a preset template by comparing the parking-lot line recognized within the region of interest of the current image frame with the template generated for the previous image frame. An intensity-based calculation method and an edge-based calculation method may be applied to a method for calculating a similarity between the templates in the similarity calculation unit 160. In particular, the edge-based similarity calculation method may include algorithms using a Hausdorff distance value, algorithms using a Hilbert scan distance value, and Chamfer matching algorithms.

Figure 7:
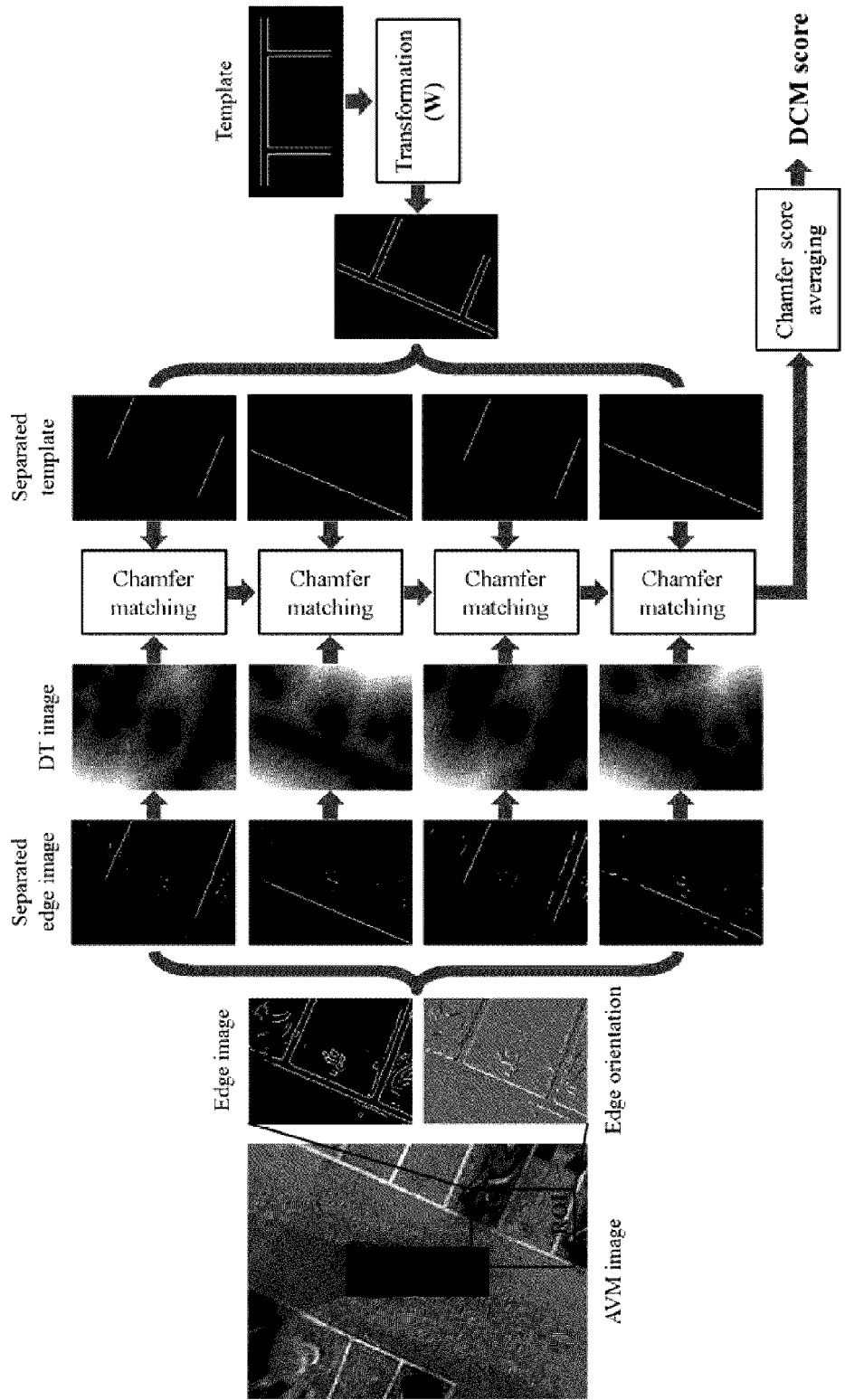

Specifically, in the similarity calculation method using the Hausdorff distance value, the outline information of an object detected on two-dimension and a distance between pixels of model and outline may be calculated to measure the similarity. In addition, the similarity calculation method using the Hilbert scan distance value may include measuring the similarity by calculating a distance between the pixels of an outline extracted from the surface of two one-dimension. Further, the similarity calculation method using the Chamfer matching algorithms may include measuring the similarity between two images by a procedure matching the outline information of a reference image and the outline information of a coordination object image. As an example, FIG. 7 illustrates the similarity calculation operation using an Orientational Chamfer Matching (hereinafter, refer to as DCM). Here, the DCM method divides the edge points of each image by the orientation to calculate the chamfer distance and, then, combines them.

The similarity calculation unit 160 may apply a method that calculates a chamfer score that corresponds to an individual orientation by dividing an orientation of each edge point, and calculates the final chamfer score through thereof among the DCM methods. In particular, an equation for calculating the chamfer score that corresponds to the individual orientation of each edge point is as follows [Equation 1].

$$d_{DCM}(W) = \frac{1}{N_T} \sum_{r=1}^{N_D} \left( \sum_{x_T \in T_r} \min_{x_E \in E_r^{IMAGE}} \|W(x_T) - x_E\|_2 \right)$$ [Equation 1]

Wherein, W refers to a transformation indicating a transformation of the template, Tr and ErIMAGE refer to a template of r-th orientation and a query edge image, ND refers to a number of the divided orientation, NT refers to a number of a total edge pixel of the template, and XT and XE refer to an edge point position of each template and the query edge image. Here, the chamfer score dDCM may have a value close to 0 as a template edge and a query edge image become similar, and may have a greater value as the template edge and query edge image differ.

In addition, the similarity calculation unit 160 may be configured to calculate the chamfer score using a distance transform (DT) which expresses a distance up to the nearest edge point. In other words, the similarity calculation unit may be configured to calculate the chamfer score by performing a convolution on the DT result of the edge image of the template and the query edge image. This method normalizes the chamfer score of each orientation of [Equation 1] by the edge point number (NTr) of each orientation to assign an equal weight to the chamfer score by each orientation regardless of a number of the edge point. This refers to [Equation 2].

$$d_{DCM}(W) = \frac{1}{N_D} \sum_{r=1}^{N_D} \left\{ \frac{1}{N_{T_r}} \sum_{x_T \in T_r} \left( \min_{x_E \in E_r^{IMAGE}} \|W(x_T) - x_E\|_2 \right) \right\}$$ [Equation 2]

Accordingly, an exemplary embodiment of the operation calculating the chamfer score in the similarity calculation unit 160 will refer to FIG. 7.

As illustrated in FIG. 7, the similarity calculation unit 160 may be configured to generate the edge images by orientation by calculating a gradient magnitude and an orientation of the edge image extracted from a Region of Interest (ROI) of an input Around View Monitoring (AVM) image, and generate the DT images from the edge images by the orientation. On the other hand, after transforming the template that corresponds to the parking-lot to which the vehicle accesses using W, the similarity calculation unit 160 may be configured to generate the edge image by the orientation of the corresponding template.

In particular, the chamfer score by the orientation may be calculated using the convolution of the DT image of the edge image by the orientation of the AVM image and the edge image by the orientation of the template. In addition, the similarity calculation unit 160 may be configured to transform W, and may be configured to calculate the chamfer score by each orientation by applying the transformed W. The transformed W may be calculated with a sum of the chamfer score by the orientation. Specifically, W may include a width, a position, a rotation, and a thickness change of the parking-lot. Therefore, the W which calculates the least chamfer score may be a position and a type of the parking-lot of the current image.

On the other hand, the similarity calculation unit 160 may be configured to correct a pre-calculated similarity by reflecting the state in which the parking-lot line is hidden, to prevent the parking-lot line recognized on the current image frame being hidden by the vehicle or the obstacle. As an example, when the parking-lot line is hidden by the vehicle on the current image frame, the similarity calculation unit 160 may be configured to not generate the edge on the vehicle position by utilizing the vehicle area information of the current image frame. In addition, when the parking-lot line is hidden by the obstacle on the current image frame, the similarity calculation unit 160 may be configured to calculate the similarity by estimating the position of the parking-lot line by utilizing an ultrasonic information and the position information of the camera.

The template correction unit 170 may be configured to determine the position of the parking-lot based on the similarity calculated by the similarity calculation unit 160, and may be configured to correct the template based on the information of the parking-lot line extracted from the determined position.

After calculating each chamfer score corresponding to different W, the template correction unit 170 may be configured to estimate a position, a size and an angle, and the like of the template on the corresponding image by selecting W which outputs the smallest value of the chamfer score, and may correct the template through thereof. Here, the template correction unit 170 may be configured to predict the template position of the current image by combining a movement information of the vehicle detected by the sensor equipped on the vehicle with an AVM image information.

As an example, the template correction unit 170 may be configured to merge the current AVM image and the movement information of the vehicle in the DCM score level with reference to the following [Equation 3].

$$d'_{DCM}(W) = \frac{1}{N_D}$$ [Equation 3]

$$\left[ \sum_{r=1}^{N_D} \left\{ (1-\alpha_r) \cdot \frac{1}{N_{T'_r}} \sum_{x_T \in T'_r} \left( \min_{x_E \in E_r^{IMAGE}} \|W(x_T) - x_E\|_2 \right) \right\} + \right.$$

$$\left. \sum_{r=1}^{N_D} \left\{ \alpha_r \cdot \frac{1}{N_{T_r}} \sum_{x_T \in T_r} \left( \min_{x_E \in E_r^{MOTION}} \|W(x_T) - x_E\|_2 \right) \right\} \right]$$

In particular, the DCM score of an AVM image-based edge (EIMAGE) may be calculated only in the template area (Tr') which is not hidden by the vehicle, and the DCM score of the vehicle movement-based edge (EMOTION) may be calculated for the template entire area (Tr). The template correction unit 170 may be configured to correct the template generated from the previous image frame only when both junctions of the parking-lot line recognized from the current image frame exist all in a stable condition. The operation for correcting the template may be described later in detail with reference to FIGS. 8 and 9.

Figures 9A, 9B:
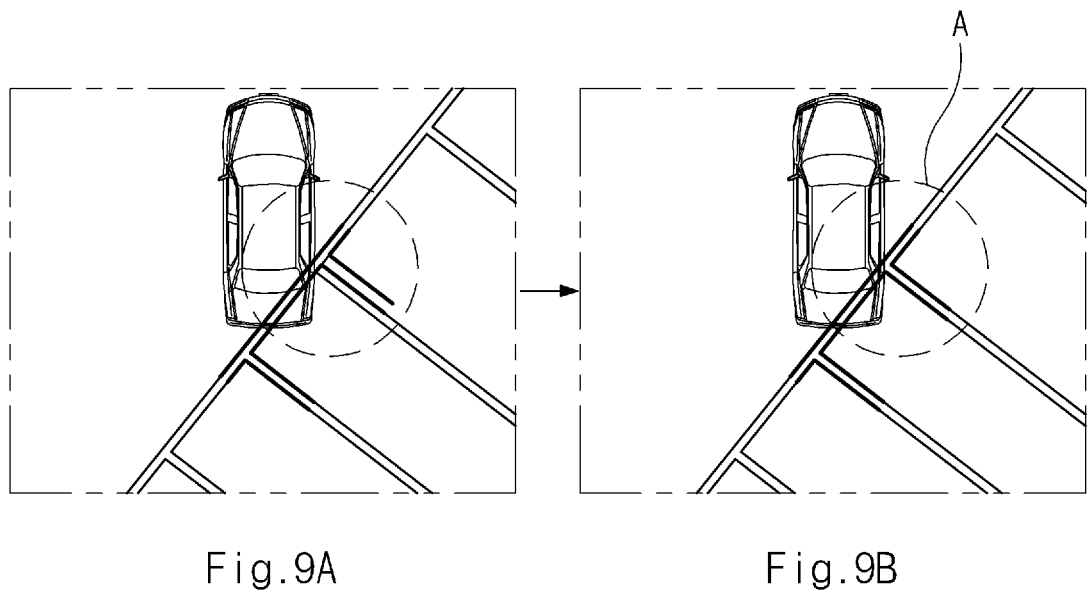

First, as illustrated in FIGS. 8A-8F, the template correction unit 170 may be configured to divide the template generated from the previous image frame, as shown in FIG. 8A, based on the parking orientation component as shown FIG. 8B, and make the vehicle mask of FIG. 8C to be applied to FIG. 8B. Here, the template to which the mask of the vehicle is applied, as shown in FIG. 8D may be divided into both orientations as shown in FIGS. 8E-8F. Therefore, the template correction unit 170 may be configured to correct the template as shown in FIGS. 9A-9B by controlling the positions of two components illustrated in FIGS. 8E-8F. The template correction unit 170 may be configured to correct the corresponding template by determining the parking-lot line thickness and the parking-lot width of the template which has the highest similarity with the parking-lot recognized on the current image frame among a plurality of the generated templates as a parameter of the final template.

Figure 10A:
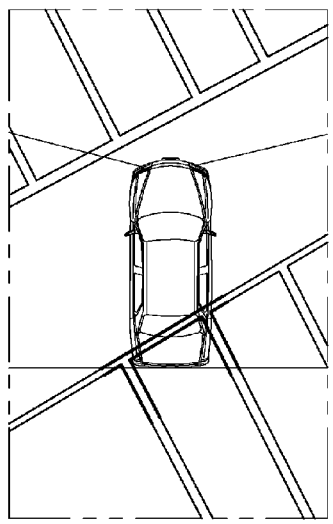
FIGS. 10A-10C are exemplary diagrams illustrating a parking supporting operation of a parking-lot tracing apparatus according to an exemplary embodiment of the present invention.
Figure 10B:
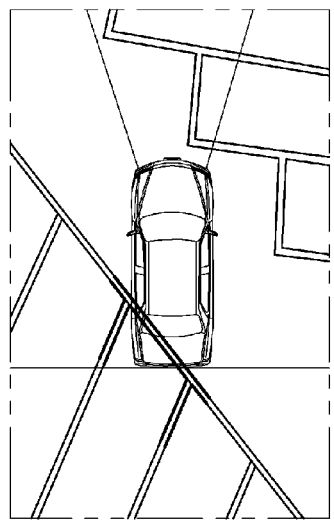
Figure 10C:
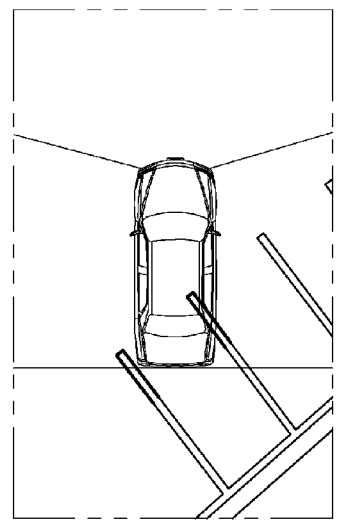

FIGS. 10A-10C illustrate the operation of tracing the parking-lot using the template while providing parking assistance, and the controller may be configured to determine the position of the parking-lot line by applying the T-shape template to the current image frame when the parking-lot line is hidden by the vehicle during a right angle reverse parking as shown in FIG. 10A. In addition, as illustrated in FIG. 10B, the parking-lot line may be hidden by the vehicle during a reverse parking on the Y-shape parking-lot. In this case, the Y-shape template may be applied to the current image frame to allow a user to determine the position of the parking-lot line more accurately. In addition, when the parking-lot line is hidden by the vehicle during the reverse parking on the I-shape parking-lot as FIG. 10C, the I-shape template may be applied to the current image frame to allow a user to determine the position of the parking-lot line more accurately.

Figure 11:
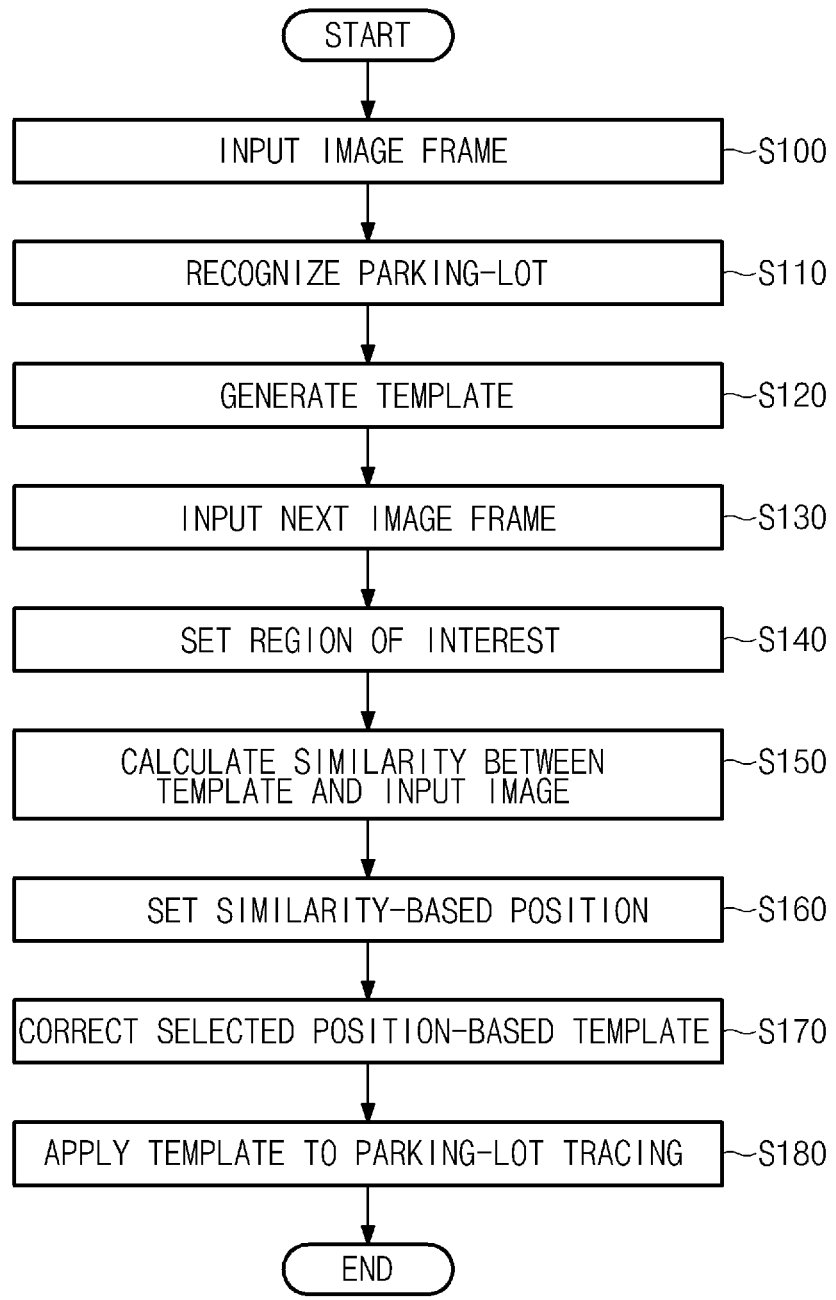
FIG. 11 is an exemplary flow chart illustrating an operation flow corresponding to a parking-lot tracing method according to an exemplary embodiment of the present invention.

The flow of the operation of the parking-lot tracing apparatus according to the present invention configured as hereinabove is described in more detail. FIG. 11 is an exemplary flow chart illustrating an operation flow corresponding to a parking-lot tracing method according to the present invention. As illustrated in FIG. 11, when an image frame is input (S100), the parking-lot tracing apparatus, operated by the controller, may be configured to recognize the parking-lot (S110), and generate a template that corresponds to the parking-lot line of the recognized parking lot (S120).

Further, when the next image frame is input (S130), the parking-lot tracing apparatus may be configured to set a region of interest from the current image frame input from the step 130 (S140), and calculate the similarity by comparing an image recognized within the set region of interest with a template generated from the step 120 (S150). In particular, the parking-lot tracing apparatus may be configured to set the optimum parking-lot position based on the similarity calculated from the step 150, and correct the template generated from the step 120 based on the set position based-parking-lot line (S170). The template generated from the step 120 or the template corrected from the step 170 may be applied to trace the parking-lot at the time of parking support (S180).

According to an exemplary embodiment of the present invention, tracing a parking-lot line may be performed more easily by using a template while an image-based parking support is performed by generating a template that corresponds to a parking-lot line from an image obtained from a parking area. In addition, since the present invention traces the parking-lot line based on the similarity of the template even though there is a hidden line or an image distortion on a current image, a tracing of the parking-lot line may be performed more easily and accuracy may be improved.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. An apparatus for tracing a parking-lot, the apparatus comprising:
   a controller includes a memory and a processor, the memory configured to store program instructions and the processor configured to execute the program instructions, the program instructions when executed configured to:
   recognize at least one parking-lot from a previous image frame which photographed a surrounding of a vehicle;
   extract a template according to a type of a parking-lot line of the recognized parking-lot;
   generate a template transformed based on a position information of the parking-lot;
   calculate similarity by comparing a template generated from a previous image frame with a parking-lot line recognized from a current image frame;
   determine a position of a parking-lot according to the calculated similarity;
   determine a position and an orientation where a similarity with the template that corresponds to the parking-lot line recognized on the current image frame is the highest based on the calculated similarity;
   correct the template based on information of the parking-lot line extracted from the determined position; and
   correct the template by determining a thickness of a parking-lot line and a width of a parking-lot extracted from the determined position as a parameter of final template.

2. The apparatus of claim 1, wherein the controller is further configured to:
   change the thickness of the parking-lot line and the width of the parking-lot of the template within a certain range; and
   generate a plurality of templates.

3. The apparatus of claim 1, wherein the controller is further configured to:
   generate a template by each type of the parking-lot when a parking-lot of a different type is recognized.

4. The apparatus of claim 1, wherein the controller is further configured to:
   calculate a similarity between a parking-lot line recognized within a region of interest and the template, when the region of interest based on a movement of the vehicle is set on the current image frame.

5. The apparatus of claim 1, wherein the controller is further configured to:
   correct the calculated similarity by reflecting when a parking-lot recognized on the current image frame is hidden by the vehicle or an obstacle.

6. A method for tracing a parking-lot, the method comprising:
   recognizing, by a controller, at least one parking-lot from an image frame which photographed a surrounding of a vehicle;
   generating, by the controller, a template that corresponds to a parking-lot line of the recognized parking-lot;
   calculating, by the controller, a similarity by comparing a parking-lot line recognized from a current image frame with a template generated from a previous image frame;
   determining, by the controller, a position of the parking-lot according to the calculated similarity;
   determining, by the controller, a position and an orientation where a similarity with the template that corresponds to the parking-lot line recognized on the current image frame is the highest based on the calculated similarity;
   correcting, by the controller, the template based on information of a parking-lot line extracted from the determined position; and
   correcting, by the controller, the template by determining a thickness of a parking-lot line and a width of a parking-lot extracted from the determined position as a parameter of final template.

7. The method of claim 6, wherein generating a template includes:
   changing, by the controller, the parking-lot line thickness and the parking-lot width of the template within a certain range and generating a plurality of templates.

8. The method of claim 6, wherein generating a template includes:
   generating, by the controller, a template by each type of the parking-lot, when a parking-lot of different type is recognized.

9. The method of claim 6, wherein calculating the similarity includes:
   calculating, by the controller, a similarity between a parking-lot recognized within a region of interest and the template when a movement-based region of interest of the vehicle is set on the current image frame.

10. The method of claim 6, wherein, after calculating the similarity further includes:
    correcting, by the controller, the calculated similarity by reflecting when the parking-lot line recognized on the current image frame is hidden.

11. A non-transitory computer readable medium containing program instructions executed by a controller, the computer readable medium comprising:
    program instructions that recognize at least one parking-lot from a previous image frame which photographed a surrounding of a vehicle;
    program instructions that extract a template according to a type of a parking-lot line of the recognized parking-lot;
    program instructions that generate a template transformed based on a position information of the parking-lot;
    program instructions that calculate similarity by comparing a template generated from a previous image frame with a parking-lot line recognized from a current image frame;
    program instructions that determine a position of a parking-lot according to the calculated similarity;
    program instructions that determine a position and an orientation where a similarity with the template that corresponds to the parking-lot line recognized on the current image frame is the highest based on the calculated similarity;
    program instructions that correct the template based on information of the parking-lot line extracted from the determined position; and
    program instructions that correct the template by determining a thickness of a parking-lot line and a width of a parking-lot extracted from the determined position as a parameter of final template.

12. The non-transitory computer readable medium of claim 11, further comprising:
   program instructions that change the parking-lot line thickness and the parking-lot width of the template within a certain range and generating a plurality of templates.

13. The non-transitory computer readable medium of claim 11, further comprising:
   program instructions that generate a template by each type of the parking-lot, when a parking-lot of different type is recognized.

14. The non-transitory computer readable medium of claim 11, further comprising:
   program instructions that calculate a similarity between a parking-lot recognized within a region of interest and the template when a movement-based region of interest of the vehicle is set on the current image frame.

15. The non-transitory computer readable medium of claim 11, further comprising:
   program instructions that correct the calculated similarity by reflecting when the parking-lot line recognized on the current image frame is hidden.

* * * * *